United States Patent
Lee et al.

(10) Patent No.: US 8,170,215 B2
(45) Date of Patent: May 1, 2012

(54) KEY MANAGEMENT METHOD FOR HOME NETWORK AND HOME NETWORK DEVICE AND SYSTEM USING THE SAME

(75) Inventors: Sun-nam Lee, Suwon-si (KR); Myung-sun Kim, Uiwang-si (KR); Su-hyun Nam, Seoul (KR); Sang-su Choi, Bucheon-si (KR); Sung-hyu Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1041 days.

(21) Appl. No.: 11/157,951

(22) Filed: Jun. 22, 2005

(65) Prior Publication Data

US 2006/0153387 A1 Jul. 13, 2006

(30) Foreign Application Priority Data

Jan. 11, 2005 (KR) .................. 10-2005-0002590

(51) Int. Cl.
 *H04L 29/06* (2006.01)
(52) U.S. Cl. ........................................ 380/281
(58) Field of Classification Search .......... 380/281
 See application file for complete search history.

(56) References Cited

U.S. PATENT DOCUMENTS

| | | | | |
|---|---|---|---|---|
| 5,623,546 A * | 4/1997 | Hardy et al. | ........ | 713/193 |
| 6,169,803 B1 * | 1/2001 | Sako et al. | ........ | 380/44 |
| 6,260,142 B1 * | 7/2001 | Thakkar et al. | ........ | 713/158 |
| 6,363,154 B1 | 3/2002 | Peyravian et al. | | |
| 7,289,631 B2 * | 10/2007 | Ishidoshiro | ........ | 380/270 |
| 7,298,849 B2 * | 11/2007 | Graunke | ........ | 380/277 |
| 2001/0014156 A1 * | 8/2001 | Murakami | ........ | 380/277 |
| 2002/0059363 A1 * | 5/2002 | Katz et al. | ........ | 709/203 |
| 2002/0154782 A1 | 10/2002 | Chow et al. | | |
| 2004/0083362 A1 * | 4/2004 | Park et al. | ........ | 713/162 |
| 2004/0168081 A1 * | 8/2004 | Ladas et al. | ........ | 713/201 |
| 2005/0050318 A1 * | 3/2005 | Alone et al. | ........ | 713/155 |

FOREIGN PATENT DOCUMENTS

| | | |
|---|---|---|
| CN | 1252198 A | 5/2000 |
| JP | 2000-125360 A | 4/2000 |
| KR | 1020020090265 A | 12/2002 |
| KR | 10-2004-0010352 A | 1/2004 |

OTHER PUBLICATIONS

Schneier, Bruce, "Applied Cryptography", Second Edition, 1996, pp. 1-9.*
WordNet definition of parameter, pp. 1, obtained from http://wordnetweb.princeton.edu/perl/webwn.*

* cited by examiner

*Primary Examiner* — Jeffrey D Popham
(74) *Attorney, Agent, or Firm* — Sughrue Mion, PLLC

(57) ABSTRACT

A method of managing a home network key in a home network environment, which has a key management server for managing the home network key and a plurality of home network devices, includes: allowing a home network device to generate device unique information and to transmit the device unique information to the key management server; allowing the key management server to generate a parameter for generating the home network key by using the device unique information and to transmit the parameter to the home network device; and allowing the home network device to generate the home network key by using the parameter. The generated home network key being independent of the device unique information.

24 Claims, 4 Drawing Sheets

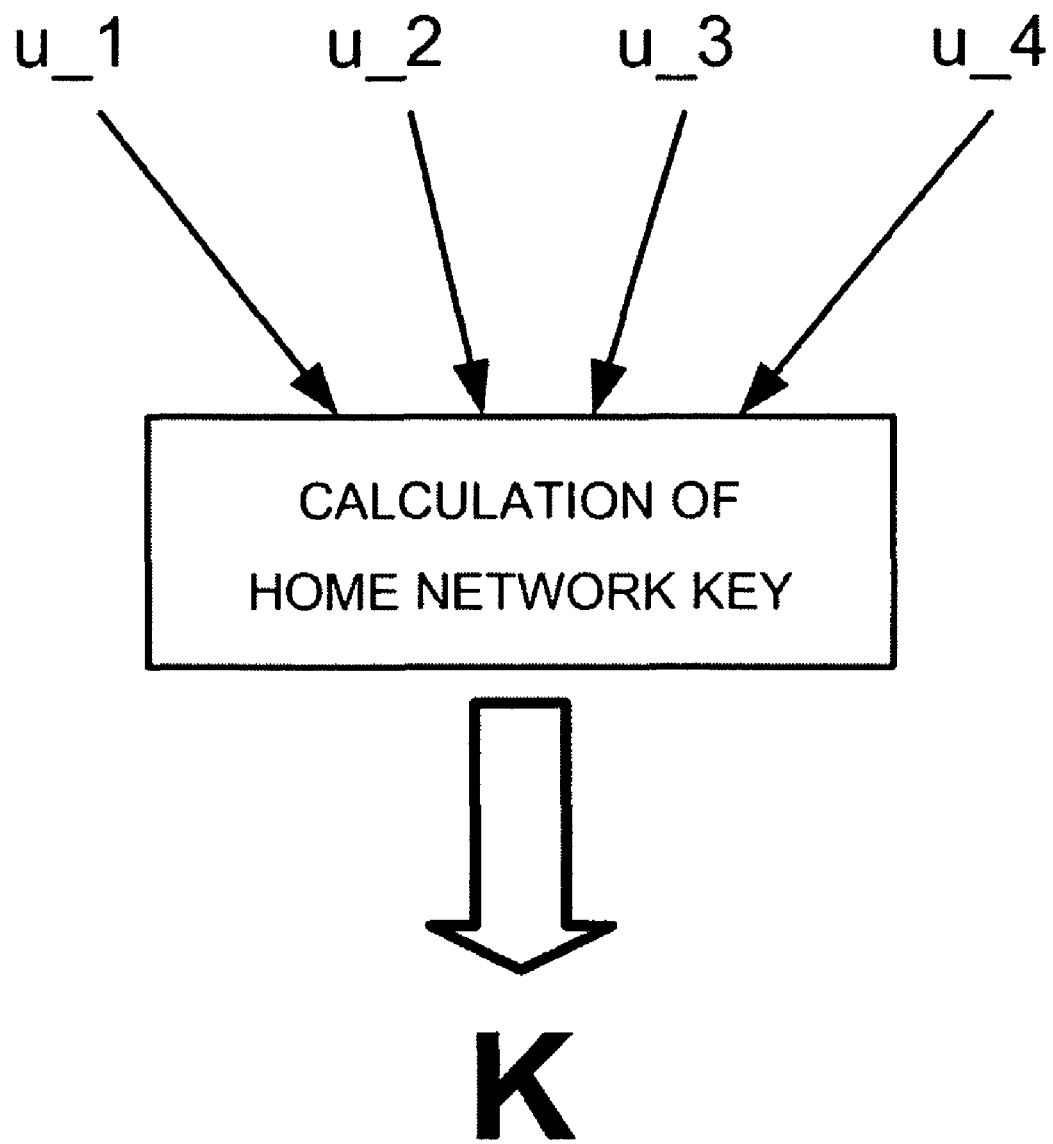

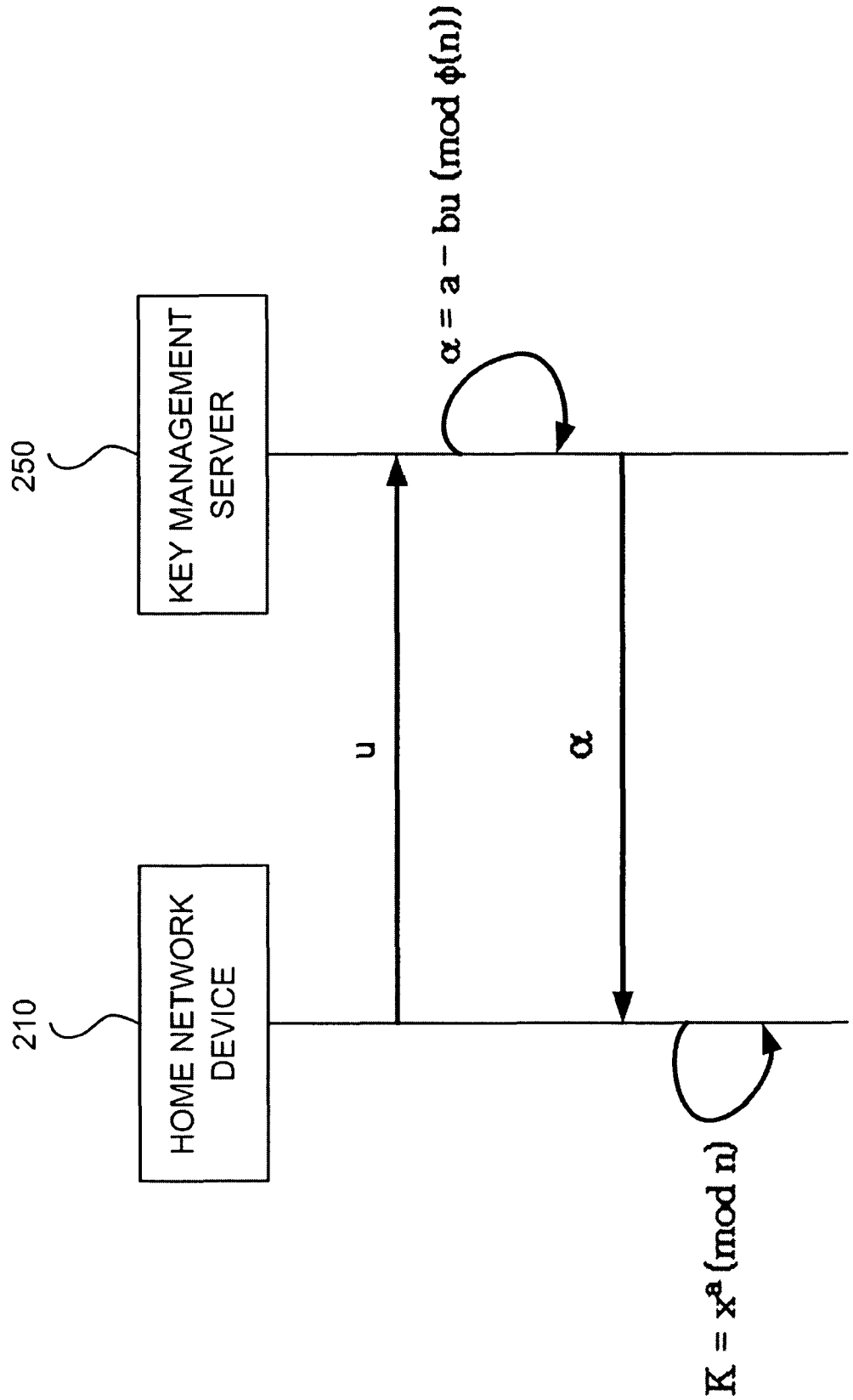

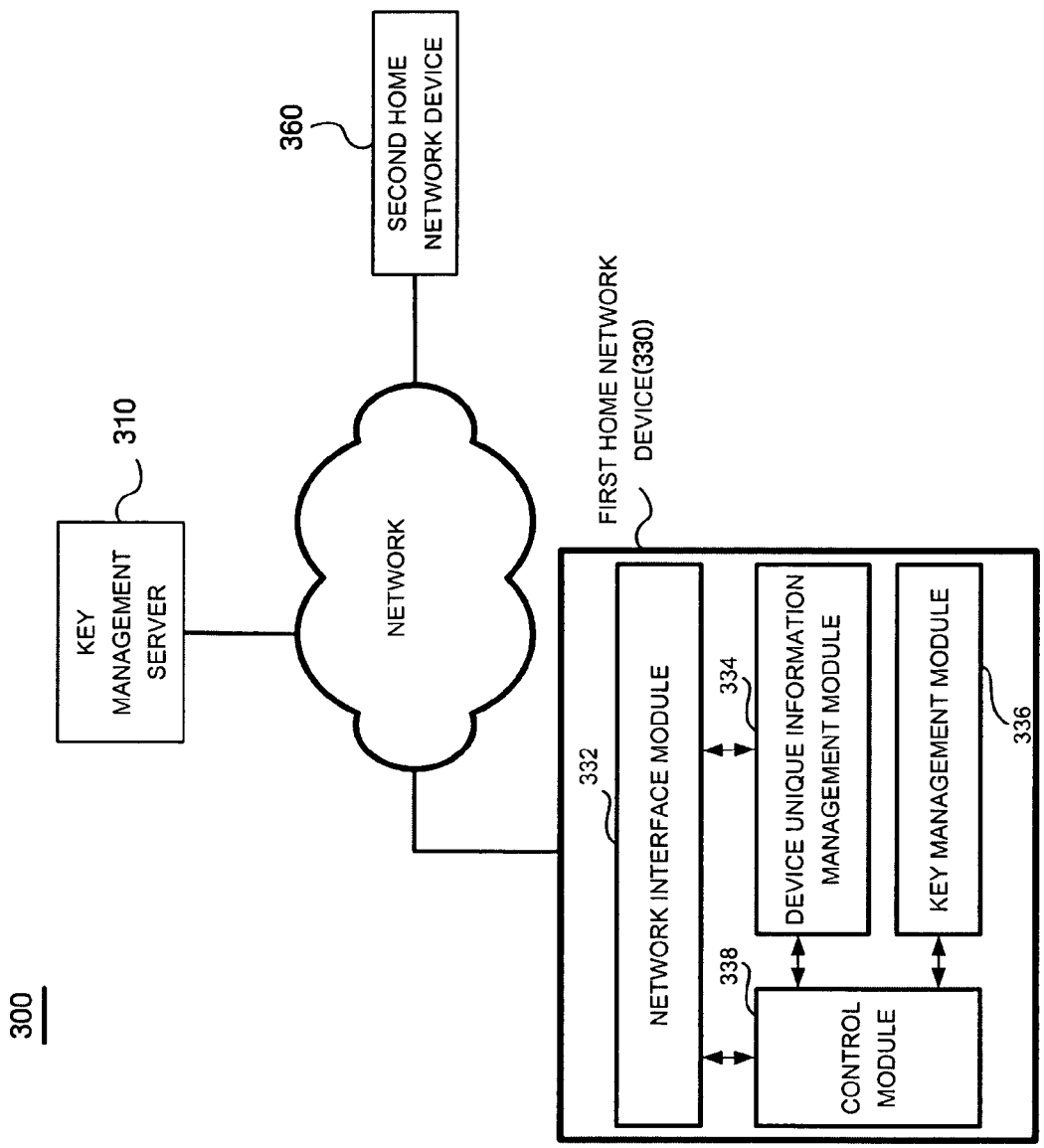

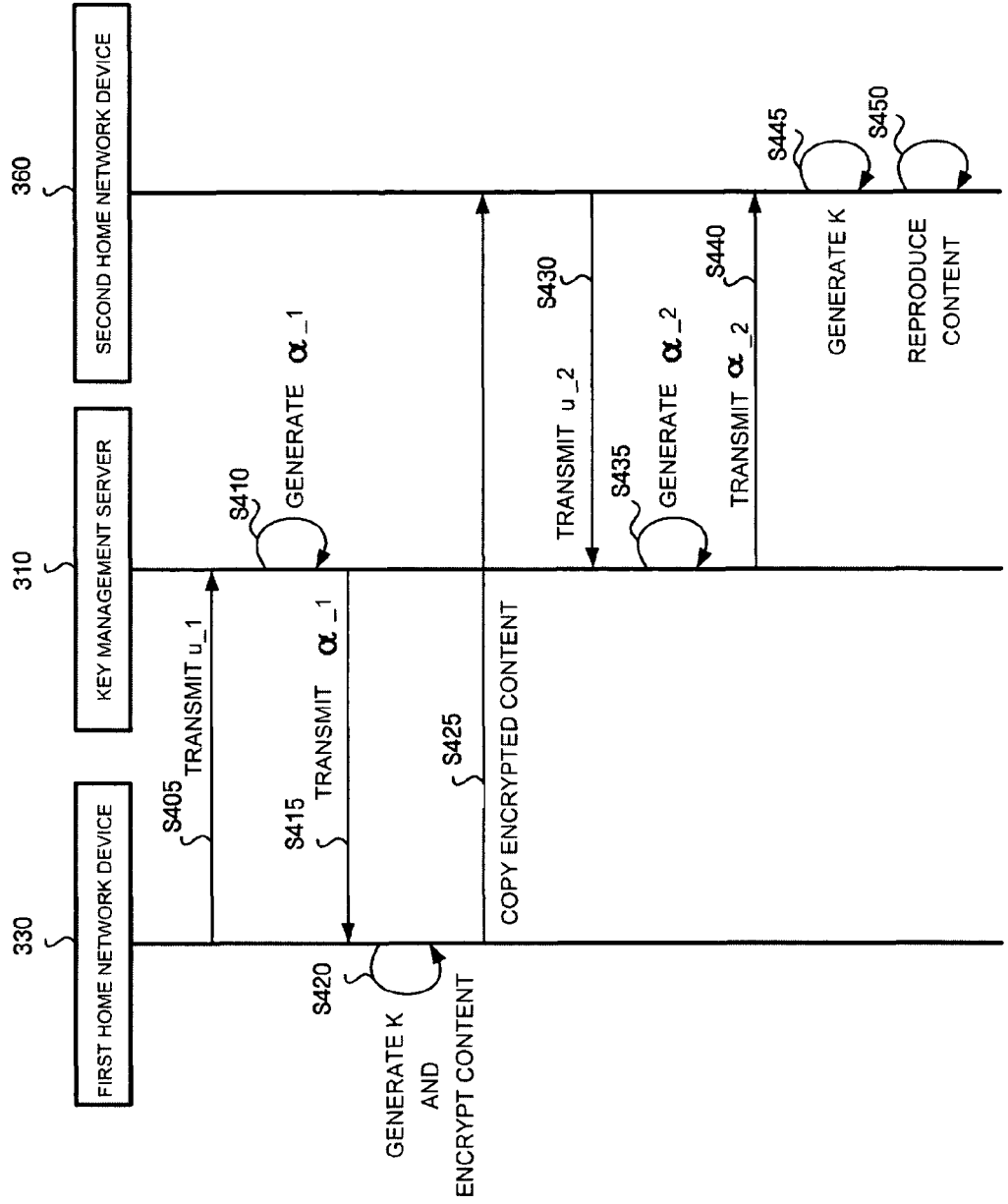

KEY MANAGEMENT METHOD FOR HOME NETWORK AND HOME NETWORK DEVICE AND SYSTEM USING THE SAME

CROSS-REFERENCE TO RELATED APPLICATION

This application claims priority from Korean Patent Application No. 10-2005-0002590 filed on Jan. 11, 2005 in the Korean Intellectual Property Office, the disclosure of which is incorporated herein by reference in its entirety.

BACKGROUND OF THE INVENTION

1. Field of the Invention

Apparatuses, methods and systems consistent with the present invention relate to managing a key in a home network environment, and more particularly to efficiently managing a key even when a home network environment varies.

2. Description of the Related Art

In a home network environment, devices constituting a home network (hereinafter referred to as "home network devices") are often added or removed by users. Home network devices generally can be classified into devices that are rarely changed after being set, such as televisions (TV), personal computers (PC), and set-top boxes, and devices that are frequently added to or removed from the home network, such as notebook computers and personal digital assistants (PDA).

If the home network devices are changed, a key inherent to the home network (hereinafter referred to as a "home network key"), which generally is required for allowing the home network devices to reproduce a variety of content, is changed and a new key is generated. In this case, at the same time as the changing of the home network key, previous home network keys should be managed by their versions so as to store or reproduce previous content. Thus, there is a problem in that the history of the home network keys must also be managed. Additionally, as an amount of content shared in the home network increases, there is a problem in that much time is required for searching for particular content and a home network key corresponding to the content.

SUMMARY OF THE INVENTION

An aspect of the present invention is to provide a method of efficiently managing a home network key without updating the home network key even when a home network environment changes.

According to an aspect of the present invention, there is provided a method of managing a home network key in a home network environment that includes a key management server, for managing the home network key, and a plurality of home network devices, the method comprising: allowing a home network device to generate device unique information and to transmit the device unique information to the key management server; allowing the key management server to generate a parameter for generating the home network key by using the device unique information and to transmit the parameter to the home network device; and allowing the home network device to generate the home network key by using the parameter, wherein the generated home network key is independent of the device unique information.

According to another aspect of the present invention, there is provided a home network device in a home network environment that includes a key management server for managing a home network key, the home network device comprising: a device-unique-information management module for generating device unique information by using its own unique information and transmitting the generated device unique information to the key management server; and a key management module for generating a home network key by using a parameter corresponding to the device unique information, the parameter being generated by the key management server, wherein the generated home network key is independent of the device unique information.

According to another aspect of the present invention, there is provided a home network system comprising: a plurality of home network devices each of which generates device unique information by using its own unique information, transmits the generated device unique information to the key management server, and generates a home network key by using a parameter corresponding to the device unique information; and a key management server that generates the parameter by using the device unique information and transmits the generated parameter to the home network devices, wherein the generated home network key is independent of the device unique information.

The present invention is not limited to the above-mentioned aspects, and other aspects and features of the present invention not described above would be readily understood by those skilled in the art with reference to the following detailed description and the drawings.

BRIEF DESCRIPTION OF THE DRAWINGS

The above and other aspects of the present invention will become more apparent by describing in detail exemplary embodiments thereof with reference to the attached drawings in which:

FIG. 1 is a diagram schematically illustrating a concept of key management according to an exemplary embodiment of the present invention;

FIG. 2 is a diagram specifically illustrating the concept of key management according to an exemplary embodiment of the present invention;

FIG. 3 is a block diagram illustrating a structure of a home network system according to an exemplary embodiment of the present invention; and FIG. 4 is a diagram illustrating a key management method according to an exemplary embodiment of the present invention.

DETAILED DESCRIPTION OF THE EXEMPLARY EMBODIMENTS

Various features and advantages of the present invention, and methods for obtaining them, will be apparent to those skilled in the art by referring to the exemplary embodiments described below in detail in conjunction with the attached drawings. The invention may, however, be embodied in many different forms and should not be construed as being limited to the exemplary embodiments set forth herein; rather, these exemplary embodiments are provided so that this disclosure will be thorough and complete and will fully convey the concept of the invention to those skilled in the art. Thus, it is intended that the present invention cover all obvious modifications and variations thereof without departing from the scope of the appended claims and their equivalents. Throughout the description, the same reference numerals denote the same elements.

FIG. 1 is an exemplary diagram schematically illustrating a concept of key management according to an embodiment of the present invention, where $u\_1$, $u\_2$, $u\_3$, and $u\_4$ denote information unique to home network devices (hereinafter referred to as "device unique information"), respectively. u_1, u_2, u_3, and u_4 are subjected to predetermined operational processes, respectively, and thus a home network key K is generated. That is, the generated home network key K is constant for any device unique information. Therefore, even when a new device is added to or an existing device is removed from the home network, the home network key K is kept constant, and thus it is not necessary to manage the history of the home network key K.

FIG. 2 is a diagram specifically illustrating the concept of key management according to an exemplary embodiment of the present invention, where a procedure of generating a home network key between a home network device 210 and a key management server 250 is shown. At this time, it is assumed that the home network device 210 and the key management server 250 belong to one home network. First, the home network device 210 transmits its device unique information u to the key management server 250. Then, the key management server 250 obtains α from Equation 1 by using the transmitted device unique information u.

$$\alpha = a - bu \ (\mathrm{mod} \ \phi(n)) \qquad \text{Equation 1}$$

where p, q, a, b, and φ(n) denote secret values, and n=p*q. Here, n is a public value. The secret values p, q, a, b, and φ(n) are known to only the key management server 250. The public value n is known to other network devices connected to the key management server 250. φ(n) is a Euler phi function and denotes the number of integers relatively prime to n, where the integers are between 1 and n.

When the key management server 250 transmits a obtained from Equation 1 to the home network device 210, the home network device 210 obtains the home network key K from Equation 2 by using the transmitted value α. Consequently, α, which is generated by the key management server 250 and transmitted to the home network device 210, can be considered as an intermediate value for generating the home network key K in the home network device 210. Hereinafter, α is referred to as a "parameter" for the purpose of convenient explanation.

$$K = x^\alpha y^u = x^\alpha x^{bu} (\mathrm{mod} \ n) = x^{(a-bu)} x^{bu} (\mathrm{mod} \ n) = x^{(a-bu+bu)} (\mathrm{mod} \ n) = x^a (\mathrm{mod} \ n) \qquad \text{Equation 2}$$

where y=x^b(mod n), and x and y are public values known to other home network devices connected to the home network device 210.

That is, the respective home network devices acquire the same home network key K regardless of the device unique information u.

FIG. 3 is a block diagram illustrating a structure of a home network system according to an exemplary embodiment of the present invention. The home network system 300 comprises a key management server 310 and home network devices 330 and 360. The key management server 310 and the home network devices 330 and 360 are connected to each other through one or more wired or wireless networks, or through one or more combinations of wired networks and wireless networks.

The key management server 310 generates a parameter a by using device unique information u transmitted from the home network devices 330 and 360, and transmits the generated parameter α to the home network devices having transmitted the device unique information u.

The home network devices 330 and 360 transmit their respective device unique information u to the key management server 310, generate a home network key K by using the parameter a transmitted from the key management server 310, and store or reproduce content by using the generated home network key K. The first home network device 330 is described as an example for explaining the structure of a home network device.

The first home network device 330 comprises a network interface module 332, a device-unique-information management module 334, a key management module 336, and a control module 338.

The network interface module 332 serves to transmit and receive data through a network. The device-unique-information management module 334 generates device unique information by using unique information of the home network device 330 and transmits the generated device unique information to the key management server 310 through the network interface module 332.

The key management module 336 generates a home network key K by using the parameter a transmitted from the key management server 310. The control module 338 encrypts and stores content of the first home network device 330, or decrypts and reproduces content encrypted by the home network key K, by using the generated home network key K through control of the respective modules. The device-unique-information management module 334 and the key management module 336 may be unified into one module, and the storage or reproduction of content may be implemented by the key management module 336.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Operations of the modules described above and the home network system 300 shown in FIG. 3 will be specifically described along with a key management method shown in FIG. 4. On the other hand, the structure of the second home network device 360 for management of the home network key is equivalent to that of the first home network device 330. For the purpose of convenient explanation, an example wherein the first home network device 330 encrypts its own content and the second home network device 360 copies and reproduces the encrypted content is shown in FIG. 4. A set-top box can be exemplified as the first home network device 330 and a personal computer (PC) can be exemplified as the second home network device 360.

First, the device-unique-information management module 334 of the first home network device 330 generates device unique information u_1 of the first home network device 330 by using hardware features such as a Media Access Control (MAC) address of the first home network device 330 and random numbers, and transmits the generated device unique information u_1 to the key management server 310 through the network interface module 332 (S405).

The key management server 310 generates a parameter α_1 from Equation 1 described above by using the transmitted device unique information u_1 (S410), and transmits the generated parameter α_1 to the first home network device 330 (S415).

The control module 338 of the first home network device 330 sends the received parameter α_1 to the key management module 336. The key management module 336 generates a home network key K from Equation 2 described above and sends the generated home network key K to the control module 338. The control module 338 encrypts its contents by using the sent home network key K (S420). At this time, the encryption of the contents may be carried out by the key management module 336. For example, if the home network key K is "KeySB1" and the content is "SB1.ts", encryption of the content "SB1.ts" by the home network key "KeySB1" gives rise to "KeySB1(SB1.ts)".

The second home network device 360 copies the encrypted content KeySB1(SB1.ts) from the first home network device 330 and stores the encrypted contents in its own storage (S425). At this time, the second home network device 360 has to perform a process of identifying and authenticating other home network devices connected to the home network, a process of searching other home network devices for content, and a process of copying desired content through the home network. These processes can be performed using the functions of a conventional home network system.

The second home network device 360 generates device unique information u_2 of the second home network device 360 by using hardware features such as a MAC address of the second home network device 360 and random numbers, and transmits the generated device unique information u_2 to the key management server 310 (S430). The key management server 310 generates a parameter α_2 from Equation 1 described above by using the transmitted device unique information u_2 (S435), and transmits the generated parameter α_2 to the second home network device 360 (S440).

The second home network device 360 generates a home network key K by inserting the parameter α_2 into Equation 2 described above, where the generated home network key K is referred to as "KeyPC1" (S445). "KeyPC1" is equivalent to the home network key "KeySB1" generated by the first home network device 330. Therefore, the second home network device 360 decrypts and reproduces the content SB1.ts by using the generated home network key KeyPC1. Consequently, the second home network device 360 generates the same home network key as the home network key generated by the first home network device 330, by using the device unique information u_2 different from the device unique information u_1 of the first home network device 330.

According to the exemplary embodiments of the present invention described above, it is possible to more conveniently and more efficiently manage a home network key without managing the history of the home network key, even if a home network environment varies.

While the present invention has been particularly shown and described with reference to exemplary embodiments thereof, it will be understood by those skilled in the art that various changes in form and details may be made therein without departing from the spirit and scope of the present invention. Therefore, the scope of the present invention is defined not by the above-mentioned exemplary embodiments and the attached drawings but by the appended claims, and all variations within the scope will be construed as being included in the present invention.

What is claimed is:

1. A method of managing a home network key in a home network environment, which includes a key management server for managing the home network key and a plurality of home network devices separate from the key management server, the method comprising:

(a) generating device unique information for at least one of the home network devices;
(b) transmitting the device unique information to the key management server;
(c) generating a parameter at the key management server using the device unique information, wherein the generating the parameter does not comprise encrypting a key;
(d) transmitting the parameter to the home network device corresponding to the device unique information; and
(e) generating the home network key at the home network device using the parameter,
wherein the generating the home network key using the parameter does not comprise decrypting the key,
the generated home network key is common to the home network devices and is not modified when a new home network device joins the home network environment and generates the home network key.

2. The method according to claim 1, wherein the device unique information is generated using a Media Access Control (MAC) address of a corresponding home network device.

3. The method according to claim 1, wherein the home network key includes secret value information of the key management server.

4. The method according to claim 1, further comprising using the home network key to encrypt content.

5. The method according to claim 1, further comprising using the home network key to decrypt encrypted content.

6. The method of claim 1, wherein each home network device comprises unique information and further comprising:
generating the device unique information for each corresponding home network device; and
maintaining the generated common network key without modification when the device unique information of a corresponding home network device is generated.

7. The method according to claim 1, wherein the home network key is used to encrypt, decrypt, and reproduce content among the home network devices.

8. The method according to claim 1, wherein the plurality of home network devices includes a first home network device, the method further comprising:
generating, by the first home network device, first device unique information which identifies the first home network device;
generating a first parameter at the key management server using the first device unique information;
generating a first home network key at the first home network device using the first parameter; and
encrypting content contained in the first home network device with the first home network key.

9. The method according to claim 8, wherein the plurality of home network devices further includes a second home network device, the method further comprising:
copying the encrypted content by the second home network device;
generating, by the second home network device, second device unique information which identifies the second home network device and is different from the first device unique information;
generating a second parameter at the key management server using the second device unique information;
generating the home network key at the second home network device using the second parameter; and
decrypting the copied encrypted content with the home network key.

10. The method according to claim 1, wherein, when the new home network device joins the home network environment:
- the home network key is newly generated for the new home network device by performing the steps (a) through (e) and using device unique information of the new home network device, and
- the newly generated home network key is an equivalent of the home network key previously generated, regardless of the device unique information of the new home network device being different from the device unique information of the home network device for which the home network key was previously generated, thereby the home network key is generated common to the plurality of home network devices of the home network environment regardless of the device unique information being different for different home network devices.

11. The method according to claim 1, wherein the operation (c) comprises generating the parameter as:

$\alpha = a - bu \pmod{\phi(n)}$, wherein $\alpha$ denotes the parameter,
u denotes device unique information of a corresponding home network device,
n is a public value and equal to a product of p and q, and
p, q, a, b, and $\phi(n)$ are secret values which are known by the key management server.

12. A home network device in a home network environment including a key management server for managing a home network key, wherein the home network device comprises a non-transitory storage medium storing modules, the modules comprising:
- a device-unique-information management module which generates device unique information by using information unique to the home network device and transmits the device unique information to the key management server; and
- a key management module which generates the home network key by using a parameter, generated by the key management server using the device unique information,
- wherein the generated parameter does not comprise an encrypted key,
- generation of the home network key, by using the parameter, does not comprise decrypting a key, and
- the generated home network key is common to a plurality of home network devices of the home network environment, which are separate from the key management server, and is not modified when a new home network device joins the home network environment and generates the home network key.

13. The home network device according to claim 12, wherein the information unique to the home network device includes a Media Access Control (MAC) address of the home network device.

14. The home network device according to claim 12, wherein the home network key includes secret value information of the key management server.

15. The home network device according to claim 12, wherein the key management module encrypts content using the home network key.

16. The home network device according to claim 12, wherein the key management module decrypts encrypted content using the home network key.

17. A home network system comprising:
- a first home network device which generates first device unique information by using information unique to the first home network device, and generates a home network key by using a first parameter corresponding to the first home network device, wherein generation of the home network key, by using the first parameter, does not comprise decrypting a key;
- a second home network device which generates second device unique information by using information unique to the second home network device, and generates the home network key by using a second parameter corresponding to the second home network device, wherein generation of the home network key, by using the second parameter, does not comprise decrypting a key; and
- a key management server which is separate from the first and second home network devices, receives the first device unique information from the first home network device, receives the second device unique information from the second home network device, generates the first parameter using the first device unique information, generates the second parameter using the second device unique information, transmits the first parameter to the first home network device, and transmits the second parameter to the second home network device,
- wherein the generated first and second parameter do not comprise encrypted keys, and
- the generated home network key is common to the first and second home network devices and is not modified when a new home network device joins the home network environment and generates the home network key.

18. The home network system according to claim 17, wherein the information unique to the first home network device includes a Media Access Control (MAC) address of the first home network device.

19. The home network system according to claim 17, wherein the information unique to the second home network device includes a Media Access Control (MAC) address of the second home network device.

20. The home network system according to claim 17, wherein the home network key includes secret value information of the key management server.

21. The home network system according to claim 17, wherein the first home network device encrypts content using the home network key.

22. The home network system according to claim 17, wherein the second home network device encrypts content using the home network key.

23. The home network system according to claim 17, wherein the first home network device decrypts encrypted content using the home network key.

24. The home network system according to claim 17, wherein the second home network device decrypts encrypted content using the home network key.

* * * * *